(12) United States Patent
Guenot et al.

(10) Patent No.: US 12,744,225 B2
(45) Date of Patent: Sep. 22, 2026

(54) BIPOLAR SEPARATOR FOR ELECTROCHEMICAL REACTOR

(71) Applicant: ALSTOM Hydrogène SAS, Aix-en-Provence (FR)

(72) Inventors: Benoit Guenot, Aix-en-Provence (FR); André Rakotondrainibe, Aix-en-Provence (FR); Bruno Gentils, Tourves (FR)

(73) Assignee: ALSTOM HYDROGENE SAS, Aix-en-Provence (FR)

( * ) Notice: Subject to any disclaimer, the term of this patent is extended or adjusted under 35 U.S.C. 154(b) by 948 days.

(21) Appl. No.: 17/752,136

(22) Filed: May 24, 2022

(65) Prior Publication Data

US 2022/0384821 A1 Dec. 1, 2022

(30) Foreign Application Priority Data

May 26, 2021 (FR) ...................................... 21 05452

(51) Int. Cl.
*H01M 8/0267* (2016.01)
*H01M 8/0228* (2016.01)
(Continued)

(52) U.S. Cl.
CPC ....... *H01M 8/0267* (2013.01); *H01M 8/0228* (2013.01); *H01M 8/026* (2013.01); *H01M 8/0276* (2013.01)

(58) Field of Classification Search
CPC .. H01M 8/0267; H01M 8/0228; H01M 8/026; H01M 8/0276; H01M 8/0213; H01M 8/0258; H01M 8/0271; H01M 8/0297; H01M 2008/1095; H01M 8/0202; Y02E 60/50; C25B 1/04; C25B 9/75; C25B 9/77; C25B 9/21; C25B 9/23
See application file for complete search history.

(56) References Cited

U.S. PATENT DOCUMENTS

2003/0194597 A1* 10/2003 Ganski ................ H01M 8/0258 429/510
2009/0269671 A1 10/2009 Kim et al.
(Continued)

FOREIGN PATENT DOCUMENTS

DE 20302430 * 5/2003 ........... H01S 5/4025
DE 10 2016 117 232 A1 3/2017
(Continued)

OTHER PUBLICATIONS

French Search Report for FR Application No. 2105452 dated Feb. 4, 2022, 2 pages.
(Continued)

*Primary Examiner* — Helen Oi K Conley
(74) *Attorney, Agent, or Firm* — NIXON & VANDERHYE

(57) ABSTRACT

The bipolar separator is formed by the superimposition of two distribution plates and two cooling plates, the two cooling plates being arranged between the two distribution plates, each distribution plate having an outer face and an inner face, the outer face of each distribution plate being provided with distribution channels for the flow of a reactive fluid, the cooling plates defining internal conduits for the circulation of a cooling fluid.

18 Claims, 4 Drawing Sheets

(51) Int. Cl.
*H01M 8/026* (2016.01)
*H01M 8/0276* (2016.01)

(56) References Cited

U.S. PATENT DOCUMENTS

| | | | |
|---|---|---|---|
| 2014/0093639 | A1 | 4/2014 | Schlag et al. |
| 2016/0218376 | A1 | 7/2016 | Liu et al. |

FOREIGN PATENT DOCUMENTS

| | | | | | |
|---|---|---|---|---|---|
| JP | 2005228500 | A | * | 8/2005 | ............. Y02E 60/50 |
| JP | 2007184214 | A | | 7/2007 | |
| JP | 2008311176 | A | | 12/2008 | |
| JP | 2009266787 | A | | 11/2009 | |
| JP | 2011-048957 | A | | 3/2011 | |
| JP | 2013069694 | A | | 4/2013 | |
| JP | 2014026941 | A | | 2/2014 | |
| WO | WO-0223645 | A2 | * | 3/2002 | .......... H01M 8/0206 |
| WO | WO-02080295 | A2 | * | 10/2002 | .......... H01M 8/0258 |
| WO | 2006/053727 | A2 | | 5/2006 | |

OTHER PUBLICATIONS

Office Action, issued in Japanese Patent Application No. 2022-085218 dated Apr. 21, 2026.

* cited by examiner 2
4
4
4A
4A
4A
22
22
20
20
20
20
6
6
12
10
12
6
8

28
32
28
36
20
18
4
36
38
28
32
14A
38
28

BIPOLAR SEPARATOR FOR ELECTROCHEMICAL REACTOR

This application claims priority to FR 21 05452 filed May 26, 2021, the entire contents of which is hereby incorporated by reference.

TECHNICAL FIELD

The present invention relates to the field of electrochemical reactors comprising a stack of separators and membrane electrode assemblies defining electrochemical cells.

BACKGROUND

Such an electrochemical reactor is for example a fuel cell for the production of electricity by electrochemical reaction between an oxidant and a fuel, or an electrolyser for the separation of chemical elements from a fluid using electricity, for example for the production of dihydrogen and dioxygen from water.

In such an electrochemical reactor, each membrane electrode assembly is in the form of a laminate comprising an ion exchange membrane inserted between two electrodes.

Each separator is in the form of a plate, with at least one of the two faces of the separator being a distribution face configured to be applied against a face of a membrane electrode assembly to channel a fluid to flow along said face of the membrane electrode assembly.

Each electrochemical cell is defined by a membrane electrode assembly between two separators, each of the separators defining a fluid chamber with the face of the membrane electrode assembly against which it is applied, the electrochemical reaction being carried out by ion exchange between fluids through the membrane electrode assembly.

Bipolar separators may be provided, each bipolar separator being interposed between two membrane electrode assemblies, each bipolar separator having two distribution faces, each of the two distribution faces being configured to be applied against a face of a respective membrane electrode assembly.

An electrochemical reactor comprises, for example, an alternating stack of bipolar separators and membrane electrode assemblies, with two end separators added to the ends of the stack to complement the two electrochemical cells at the ends of the stack.

SUMMARY OF THE INVENTION

One of the aims of the invention is to provide an electrochemical reactor bipolar separator that is easy and economical to manufacture, while achieving satisfactory performance.

To this end, the invention proposes a bipolar separator for an electrochemical reactor, the bipolar separator being formed by the superimposition of two distribution plates and two cooling plates, the two cooling plates being disposed between the two distribution plates, each distribution plate having an outer face and an inner face, the outer face of each distribution plate being provided with distribution channels for the flow of a reactive fluid, the cooling plates defining internal conduits for the circulation of a cooling fluid.

According to particular embodiments, the manufacturing method has one or more of the following features taken individually or in any combination that is technically possible:

the area of the inner face of one or each of the channel plates opposite the distribution channels of the outer face is substantially flat;

the inner face of one or each of the distribution plates is substantially flat;

the internal conduits are delimited between the two cooling plates;

each cooling plate has a first face facing the adjacent distribution plate and a second face facing the other cooling plate;

one or each of the cooling plates has on its first face at least one sealing groove for receiving a seal interposed between this cooling plate and the adjacent distribution plate;

the inner face of the distribution plate facing the cooling plate is free of a sealing groove;

one or each of the cooling plates has, on its second face, cooling channels defining said internal conduits;

the area of the first face of one or each of the cooling plates opposite the cooling channels is substantially flat;

the cooling channels have a depth of between 0.20 mm and 0.35 mm, in particular a depth of 0.30 mm;

each of the cooling plates has cooling channels on its second face, each cooling channel of one of the cooling plates being located opposite a cooling channel of the other cooling plate and forming an internal conduit therewith;

the bipolar separator comprises distribution ports provided through the bipolar separator for the passage of reactive fluids, each distribution port being associated with the distribution channels of one of the distribution plates with which it is in fluid communication, the distribution channels of one or each of the distribution plates being in fluid communication with one or each of the distribution ports via connection ports provided through the distribution plate and opening into connection conduits defined between the distribution plate and the adjacent cooling plate and opening into the distribution ports;

one or each of the distribution plates and the cooling plates is made of a graphite-based material, preferably flexible, expanded graphite or carbon;

one or each of the distribution plates and the cooling plates has a thickness of between 0.4 and 0.6 mm, in particular a thickness of 0.5 mm.

The invention also relates to an electrochemical reactor such as a fuel cell or electrolyser, comprising a stack including alternating bipolar separators as defined above and membrane electrode assemblies.

The invention also relates to a method of manufacturing a bipolar separator as defined above, comprising shaping four strips of material in parallel, each strip of material being shaped by passing between at least one pair of shaping rollers, two of the strips of material being shaped to form distribution plates and two of the strips of material being shaped to form cooling plates, superimposing the four shaped strips of material to form a strip of separators formed by a succession of bipolar separators each formed by two cooling plates interposed between two distribution plates, then cutting the strip of separators to obtain bipolar separators.

BRIEF DESCRIPTION OF THE DRAWINGS

The invention and its advantages will become apparent upon reading the following description, given only as a nonlimiting example, referring to the attached drawings, in which.

DETAILED DESCRIPTION OF PREFERRED EMBODIMENTS

Figure 1:
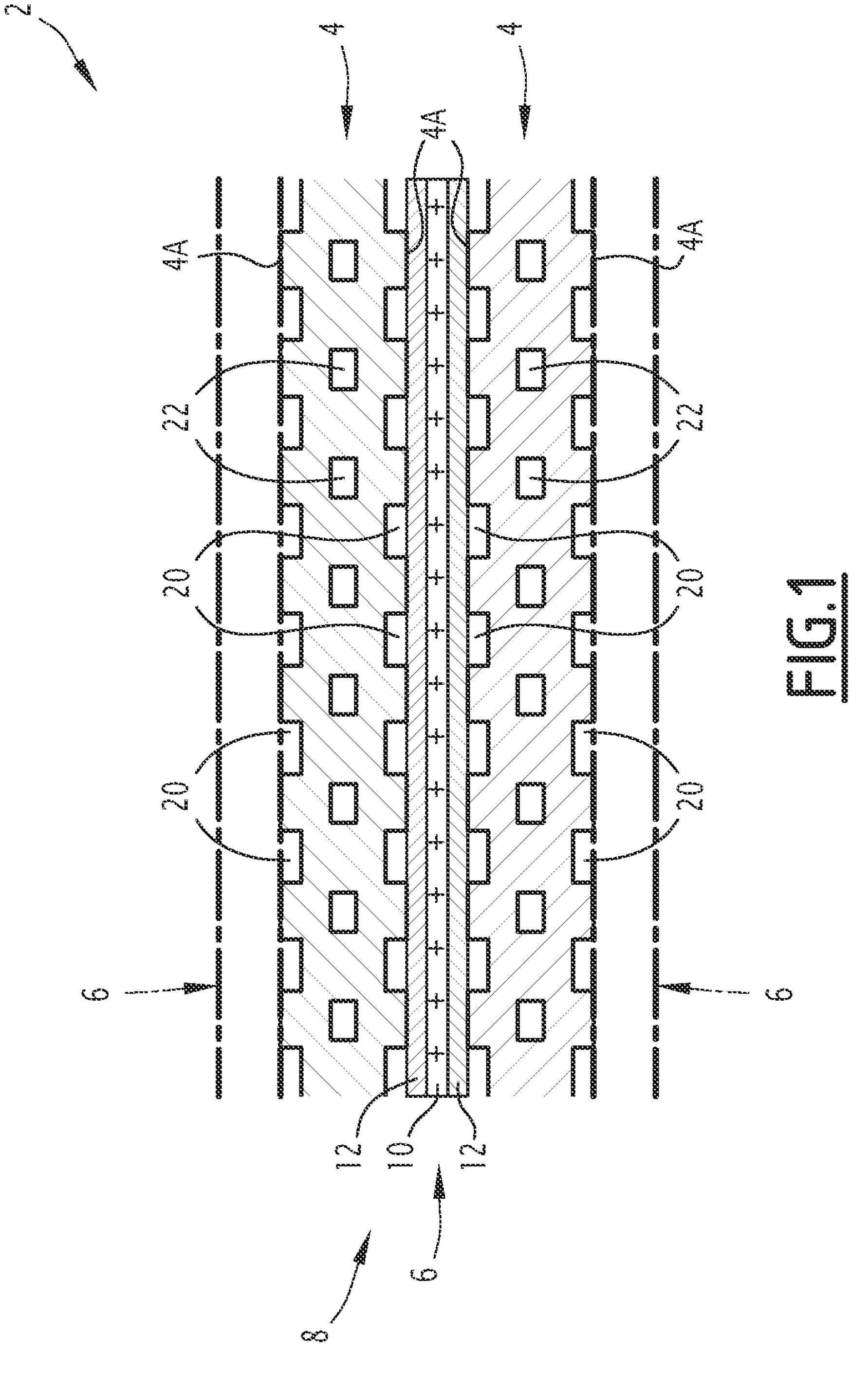
FIG. 1 is a cross-sectional view of an electrochemical reactor stack, showing in particular a membrane electrode assembly interposed between two bipolar separators.

The electrochemical reactor 2 shown in FIG. 1 has a stack comprising bipolar separators 4 arranged alternately with membrane electrode assemblies 6, defining superimposed electrochemical cells 8.

In practice, the stack also comprises two end separators (not shown) arranged at the ends of the stack.

Each electrochemical cell 8 is formed by a membrane electrode assembly 6 interposed between two separators, namely two bipolar separators 4 or one bipolar separator 4 and one end separator when it is one of the two electrochemical cells 8 located at the ends of the stack.

In practice, an electrochemical reactor 2 may comprise several tens or hundreds of superimposed electrochemical cells 8.

Only an electrochemical cell 8 consisting of a membrane electrode assembly 6 arranged between two bipolar separators 4 is shown in FIG. 1 for clarity of the drawings.

Each membrane electrode assembly 6 is in the form of a laminate consisting of an ion exchange membrane 10 sandwiched between two electrodes 12. The ion exchange membrane 10 is for example a proton exchange membrane (PEM).

In each electrochemical cell 8, each separator is applied against a respective face of the membrane electrode assembly 6.

Each of the two separators on either side of the membrane electrode assembly 6 of each electrochemical cell 8 (each of the two bipolar separators 4 in the case of electrochemical cell 8 in FIG. 1) is configured to channel a reactive fluid along the face of the membrane electrode assembly 6 against which it is applied, for the electrochemical reaction with ion exchange between the reactive fluids channeled through the two separators on either side of the membrane electrode assembly 6, the ions passing through the membrane electrode assembly 6.

If the electrochemical reactor 2 is a fuel cell, one of the two separators is configured to channel a fuel fluid along the face of the membrane electrode assembly 6 against which it is applied, the other separator being configured to channel an oxidising fluid along the other face of the membrane electrode assembly 6 against which it is applied.

Each bipolar separator 4 is arranged in the stack by being interposed between two membrane electrode assemblies 6.

Each bipolar separator 4 is in the form of a plate and has two opposing distribution faces 4A, each of the two distribution faces 4A being configured to channel a fluid along the face of the membrane electrode assembly 6 against which that distribution face 4A is applied.

The bipolar separators 4 are similar and a single bipolar separator 4 will be described in more detail with reference to FIGS. 2 and 3.

Figure 2:
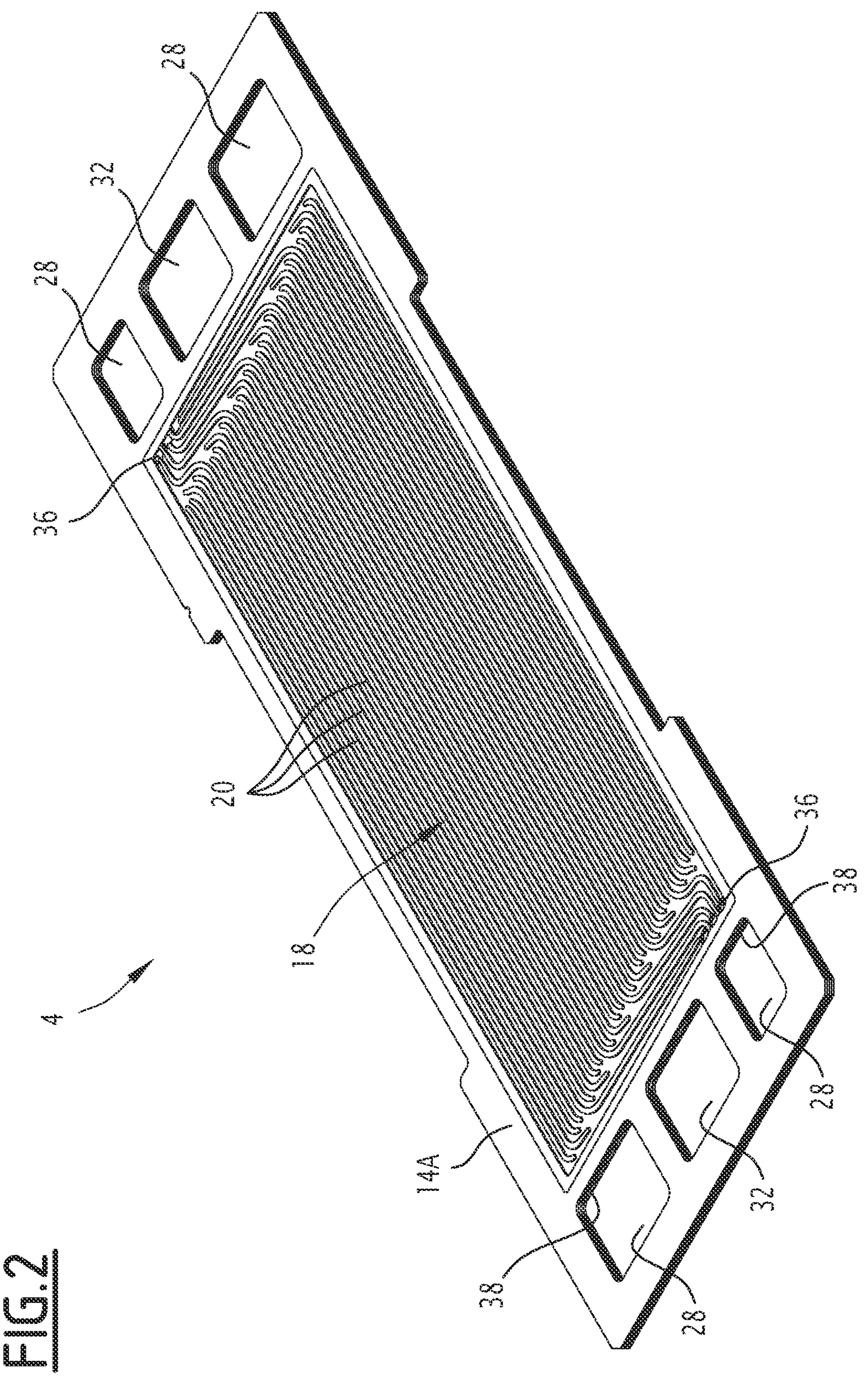
FIG. 2 is an assembled perspective view of a bipolar separator with a laminate structure.
Figure 3:
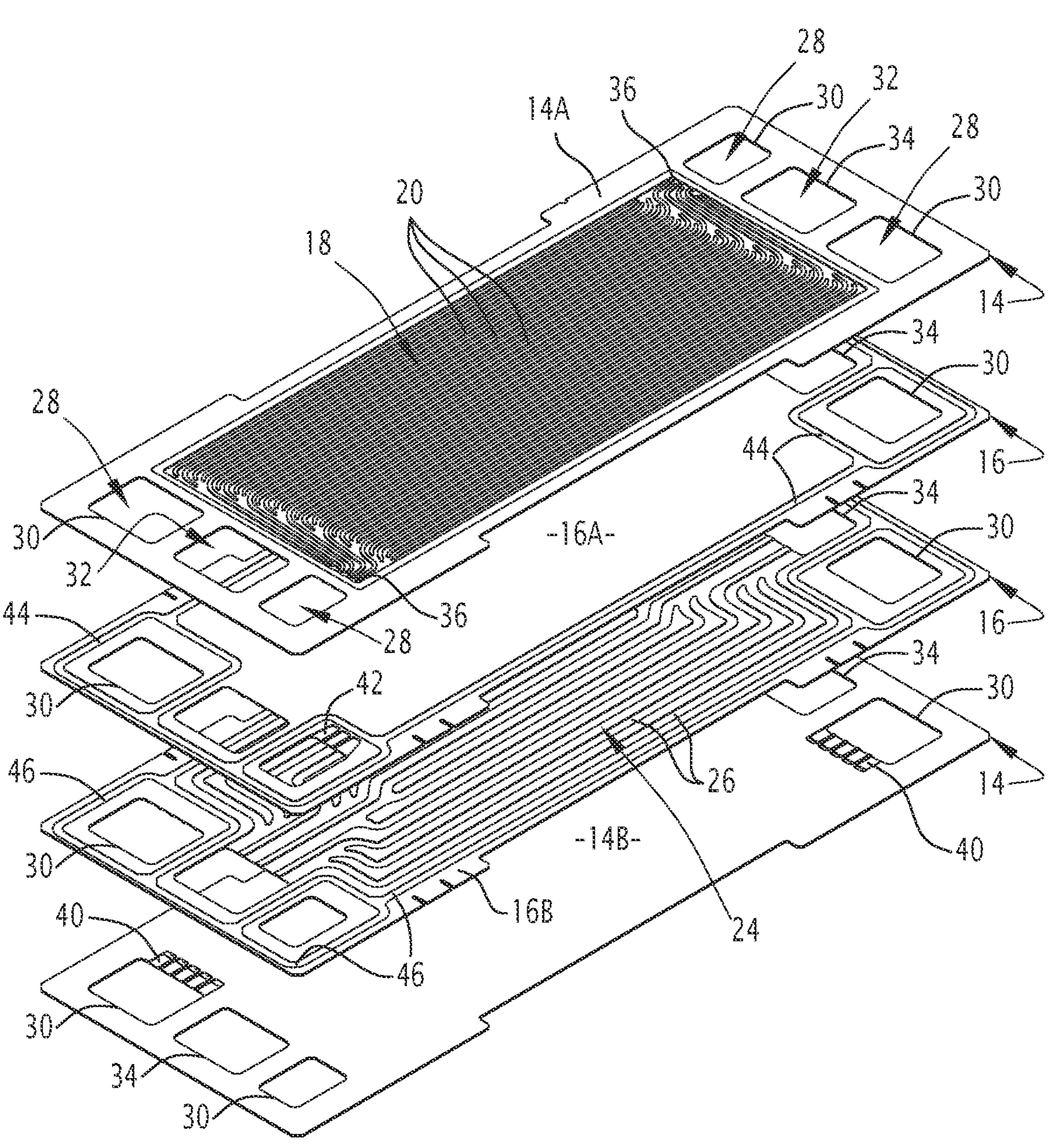
FIG. 3 is an exploded perspective view of the bipolar separator of FIG. 2, illustrating the layered structure of the bipolar separator, including two distribution plates and two cooling plates.

As shown in FIGS. 2 and 3, the bipolar separator 4 is in the form of a plate with a laminate structure.

The bipolar separator 4 is formed by the superimposition of two distribution plates 14 and two cooling plates 16, the two cooling plates 16 being located between the two distribution plates 14.

Each distribution plate 14 has an outer face 14A and an inner face 14B which are opposite each other.

The outer face 14A of each distribution plate 14 faces the outside of the bipolar separator 4. It is intended to be applied against a membrane electrode assembly 6. The outer face 14A of each distribution plate 14 defines a distribution face 4A of the bipolar separator 4.

The inner face 14B faces the inside of the bipolar separator 4. It faces the other distribution plate 14 of the bipolar separator 4.

Each cooling plate 16 is arranged between one of the two distribution plates 14 and the other cooling plate 16.

Each cooling plate 16 has a first face 16A facing the distribution plate 14 against which it is applied, and a second face 16B facing the other cooling plate 16.

The outer face 14A of each distribution plate 14 has a distribution area 18 in which distribution channels 20 are provided for the flow of a reactive fluid. The distribution channels 20 are configured to channel a fluid along the face of the membrane electrode assembly 6 against which this outer face 14A is applied.

Preferably, the area of the inner face 14B located at the back of the distribution area of the outer face 14A, i.e. opposite the distribution area 18 of the outer face 14A, is substantially flat.

In particular, the distribution channels 20 are recessed in the outer face 14A, preferably without being negative on the inner face 14B.

The two cooling plates 16 define internal conduits 22 (FIG. 1) for the circulation of a cooling fluid. The internal conduits 22 extend inside the bipolar separator 4, within the thickness of the bipolar separator 4.

Preferably, the cooling plates 16 define the internal conduits 22 between them. Each internal conduit 22 is defined between the two cooling plates 16.

The second face 16B of each cooling plate 16 has, for example, a cooling zone 24 with cooling channels 26 for the circulation of a cooling fluid between the two cooling plates 16.

In one embodiment, each cooling channel 26 of each cooling plate 16 is located opposite a cooling channel 26 of the other cooling plate 16 with which it defines an internal conduit 22. Each internal conduit 22 is defined by a cooling channel 26 of one of the two cooling plates 16 located opposite a cooling channel 26 of the other of the two cooling plates 16.

The distribution zones 18 and the cooling zones 24 are preferably aligned along the stacking direction of the distribution plates 14 and the cooling plates 16.

Advantageously, the area of the first face 16A of each cooling plate 16 located at the back of the cooling zone 24 of the second face 16B of this cooling plate 16, i.e. opposite to the cooling zone 24 of the second face 16B of this cooling plate 16, is substantially flat.

In particular, the cooling channels 26 are recessed on the second face 16B, preferably without being negative on the first face 16A.

Preferably, each distribution plate 14 has a thickness of between 0.4 mm and 0.6 mm, for example a thickness of about 0.5 mm.

Preferably, each distribution channel 20 has a depth of between 0.15 mm and 0.35 mm, for example a depth of about 0.30 mm.

Preferably, each cooling plate 16 has a thickness of between 0.4 mm and 0.6 mm, for example a thickness of about 0.5 mm.

Preferably, each cooling channel 26 has a depth of between 0.20 mm and 0.35 mm, for example a depth of about 0.30 mm.

The bipolar separator 4 includes holes through the bipolar separator 4 to form manifolds through the stack when the bipolar separators 4 are stacked with the membrane electrode assemblies 6.

The reactive fluids supplying the electrochemical cells 8 and the cooling fluid each arrive through one of the ports, which defines an inlet port for that fluid, and leave through another of the ports, which defines an outlet port for that fluid.

In particular, the bipolar separator 4 comprises distribution ports 28 provided through the bipolar separator 4 for the passage of reactive fluid(s), each distribution port 28 being associated with distribution channels 20 of one of the distribution plates 14 with which it is in fluid communication.

The bipolar separator 4 comprises, for example, two distribution ports 28 in fluid communication with the distribution channels 20 of one distribution plate 14, and two further distribution ports 28 in fluid communication with the distribution channels 20 of the other distribution plate 14.

One of the distribution ports 28 associated with each distribution plate 14 serves to supply the distribution channels 20 of this distribution plate 14 with reactive fluid, the other serving to discharge the reactive fluid after it circulates within the distribution channels 20 of this distribution plate 14.

Each of the distribution ports 28 is formed by the alignment of distribution openings 30 formed in the plates of the bipolar separator 4, namely the two distribution plates 14 and the two cooling plates 16.

The bipolar separator 4 comprises two cooling ports 32, each cooling port 32 being in fluid communication with the internal conduits 22.

One of the cooling ports 32 is used to supply cooling fluid to the internal conduits 22, the other cooling port 32 is used to discharge the cooling fluid after it has passed through the internal conduits 22.

Each of the cooling holes 32 is formed by the alignment of cooling openings 34 formed in the plates of the bipolar separator 4.

In one example embodiment, the distribution channels 20 of one or each of the distribution plates 14 are in fluid communication with one or each of the associated distribution ports 28 via connection ports 36 formed through the distribution plate 14 and opening into connection conduits 38 defined between the distribution plate 14 and the adjacent cooling plate 16 and opening into the distribution ports 28.

Only the ends of the connection conduits 38 opening into two of the distribution ports 28 on the left in FIG. 2 are visible.

Each connection conduit 38 is for example formed by a connection channel 40 formed on the inner face 14B of the distribution plate 14 and/or a connection channel 42 formed on the first face 16A of the adjacent cooling plate 16 (FIG. 3).

In particular, each connection conduit 38 is for example formed by a connection channel 40 formed on the inner face 14B of the distribution plate 14 and a connection channel 42 formed on the first face 16A of the adjacent cooling plate 16, the two connection channels 40, 42 being located opposite each other.

On the outer face 14A of the or each distribution plate 14, the distribution channels 20 are separated from the or each distribution opening 30 defining a distribution port 28 associated with those distribution channels 20.

This type of connection of the distribution channels 20 of the or each distribution plate 14 to the or each associated distribution port 28 obviates the need to provide a seal around the distribution port 28 between the outer face 14A and the adjacent membrane electrode assembly 6, a seal around the distribution area 18 being sufficient.

In the illustrated example, the distribution channels 20 of each distribution plate 14 are in fluid communication with each distribution port 28 associated with those distribution channels 20 via connection ports 36 provided through the distribution plate 14 and connection conduits 38 defined between the distribution plate 14 and the adjacent cooling plate 16.

Each connection conduit 38 is formed by a connection channel 40 formed on the inner face 14B of the distribution plate 14 and a connection channel 42 formed on the first face 16A of the adjacent cooling plate 16, the two connection channels 40, 42 being located opposite each other.

Only connection channels 40 of a distribution plate 14 and connection channels 42 of a cooling plate 16 are visible in FIG. 3.

Advantageously, the inner face 14B of each distribution plate 14 is substantially flat, in particular at the back of the distribution area 18.

The inner face 14B of each distribution plate 14 is flat except for any connection channels 40, each connection channel 40 connecting at least one connection port 36 to a distribution port 28.

Alternatively, the inner face 14B of each distribution plate 14 is completely flat.

In such a case, any connection channels 38 are, for example, delimited by connection channels 42 provided on the first face 16A of the adjacent distribution plate 16.

The internal conduits 22 are fluidly connected to the two cooling ports 32 of the bipolar separator 4.

In one embodiment, this is achieved by the cooling channels 26 of each cooling plate 16 joining each of the cooling openings 34 of that cooling plate 16.

The bipolar separator 4 is configured to provide a seal between the superimposed plates forming the bipolar separator 4.

In particular, the bipolar separator 4 is configured to provide a seal between each distribution plate 14 and the adjacent cooling plate 16 and/or between the two cooling plates 16.

Sealing is ensured, for example, by means of seals (not shown) in sealing grooves provided on the superimposed plates forming the bipolar separator 4.

Preferably, the inner faces 14B of the distribution plates 14 are free of sealing grooves.

In this case, the sealing grooves are formed exclusively in the cooling plates 16, more precisely on the first faces 16A and/or the second faces 16B of the cooling plates 16.

The sealing grooves are configured to seal individually around each distribution port 28 between each distribution plate 14 and the adjacent cooling plate 16.

Each cooling plate 16 comprises, for example, on its first face 16A, first sealing grooves 44 extending around each distribution opening 30 of the cooling plate 16 in a closed line individually surrounding that distribution opening 30.

Optionally, on each cooling plate 16, the first sealing grooves 44 are configured to extend around the periphery of the first face 16A of the cooling plate 16 to provide a seal between the first face 16A of the cooling plate 16 and the inner face 14B of the adjacent distribution plate 14 around the entire periphery thereof.

The sealing grooves are configured to seal individually around each distribution port 28 between the two cooling plates 14, to prevent the passage of reactive fluid between the two cooling plates 14.

Each cooling plate 16 has, for example, on its second face 16B, second sealing grooves 46 extending around each distribution opening 30 of the cooling plate 16 in a closed line individually surrounding that distribution opening 30.

The sealing grooves are configured to seal around each cooling port 32 and the cooling zone 24 between the cooling plate 16, to channel the cooling fluid from one cooling port 32 to the other, through the internal conduits 22 located in the cooling zone 24.

The second sealing grooves 46 extend in a closed line extending around the cooling zone 24 further encompassing each cooling port 32.

The second sealing grooves 46 are configured to provide a sealed separation between the cooling zone 24 and each of the distribution ports 28, and between the distribution ports 28.

In one embodiment, the two distribution plates 14 are not identical

For example, as illustrated in FIGS. 2 and 3, the distribution ports 28 for the circulation of a fluid in the distribution channels 20 of one of the two distribution plates 14 are larger than the distribution ports 28 for the circulation of a fluid in the distribution channels 20 of the other of the two distribution plates 14.

The distribution plate 14, whose distribution channels 20 are fluidically connected to the larger distribution ports 28, is provided with five connection openings 36 connecting the distribution channels 20 to each of the distribution ports 28, while the distribution plate 14, whose distribution channels 20 are fluidically connected to the smallest distribution ports 28, is provided with three connection ports 36 connecting the distribution channels 20 to each of the distribution ports 28.

Distribution ports 28 of different sizes allow for the stoichiometry of the electrochemical reaction, and provide for a greater flow of reactive fluid in the electrochemical cells 8 for one reactive fluid than for the other reactive fluid.

In one example, the two cooling plates 16 are not identical.

In the embodiment shown in FIG. 3, each cooling plate 16 is provided with five connection channels 42 for connection to each of the two larger distribution ports 28, and three connection channels 42 for connection to each of the two smaller distribution ports 28.

In another embodiment, the two distribution plates 14 are identical and/or the two cooling plates 16 are identical.

In one example, each of the distribution plates 14 and/or each of the cooling plates 16 is made from a sheet of graphite-based material, preferably flexible, expanded graphite or pure carbon, in particular Graphtech® marketed by the company GrafCell, Graphoil, Poco Graphite marketed by the company Entegris, or SigraTherm® marketed by the company SGL Carbon.

Preferably, the distribution plates 14 and the cooling plates 16 are made of the same material.

In one embodiment, each of the distribution plates 14 and/or each of the cooling plates 16 is made by calendering, stamping and/or embossing a sheet or strip, in particular by stamping, stamping and/or embossing by passing the sheet or strip between a pair of shaping rollers configured to form channels, sealing grooves and/or openings in the sheet or strip passing between the two rollers.

In one embodiment, a strip is passed between the forming rollers to form channels, sealing grooves and/or openings in the strip to form a plurality of plates along the strip, prior to cutting the strip into separate plates, each plate forming, as appropriate, a distribution plate 14 or a cooling plate 16.

According to an advantageous manufacturing method, four strips are formed in parallel to form plates on each strip, two strips being formed to form distribution plates 14 and two strips being formed to form cooling plates 16, then the strips being superimposed so as to form a separator strip comprising a plurality of bipolar separators 4 distributed along the separator strip, and then cutting the separator strip thus formed to separate the bipolar separators 4.

The manufacturing method optionally comprises the application of sealing gaskets in sealing grooves and/or adhesive layers between the strips of plates before the strips are superimposed, preferably under pressure, to form the separator strip.

The manufacturing method optionally comprises heating the strip of separators resulting from the assembly of strips, for example to cure seals and/or one or more adhesive layers arranged between the strips prior to superimposing them.

Figure 4:
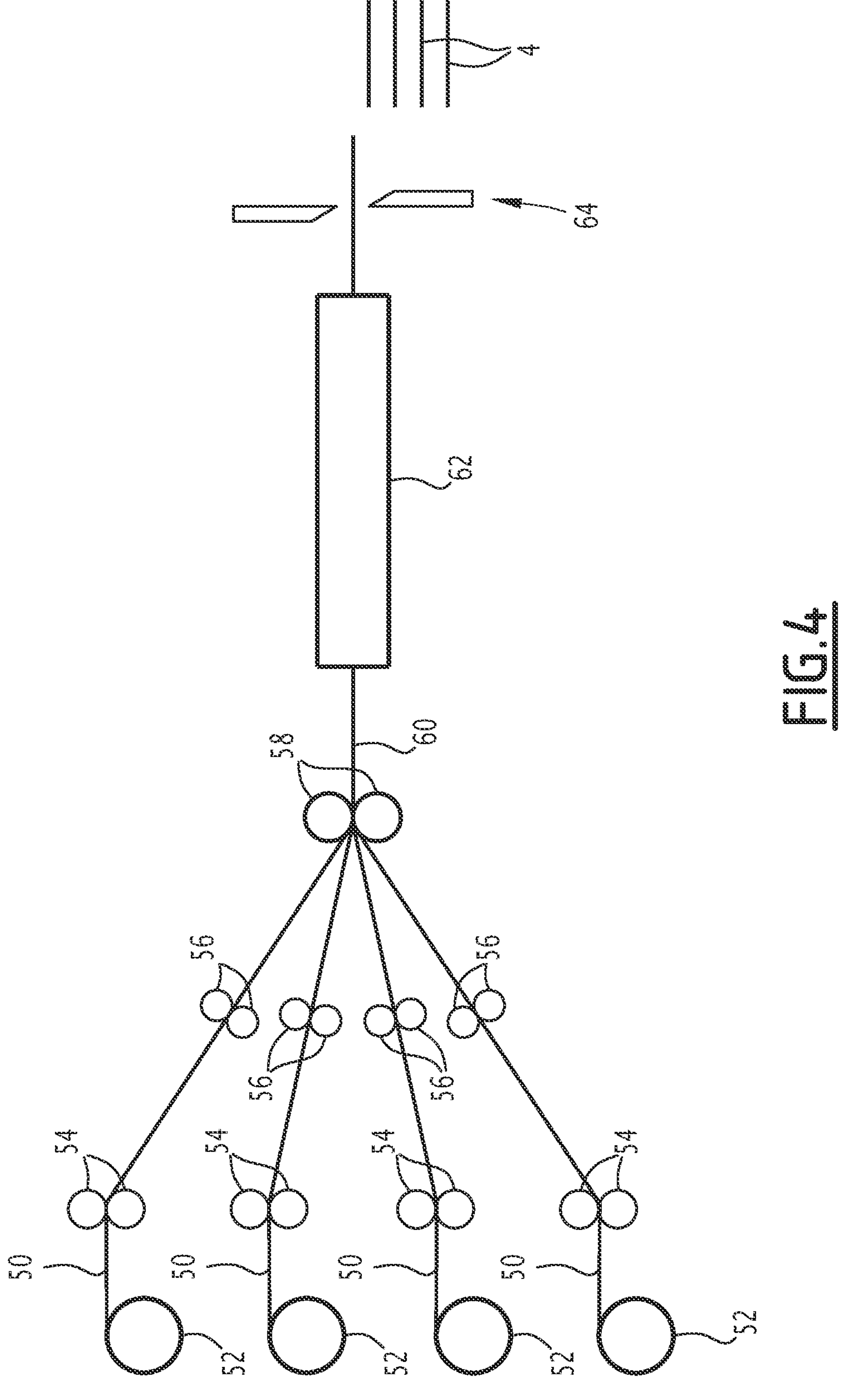
FIG. 4 is a schematic view illustrating a method of manufacturing bipolar separators 4.

In the example shown in FIG. 4, bipolar separators 4 are made from four strips of material 50 made from the same material and preferably packaged as rollers 52.

The strips of material 50 are shaped in parallel, joined together and then cut to obtain the bipolar separators 4.

Each material strip 50 is shaped by passing between the two rollers of at least one pair of shaping rollers 54 to form channels (distribution channels, cooling channels, connection channels, etc.), sealing grooves and/or openings (distribution opening, cooling openings), by calendering, stamping and/or embossing.

Each material strip 50 then optionally receives an adhesive layer and/or sealant, applied to the material strip 50 by passing between the two rollers of at least one pair of applicator rollers 56.

In the example shown, each material strip 50 passes between the two rollers of a pair of applicator rollers 56.

Alternatively, at least one of the material strips 50 does not pass between two applicator rollers 56 and/or at least one material strip 50 passes between the two applicator rollers of at least two pairs of applicator rollers 56.

A strip of material 50 may, for example, be passed between the rollers of two pairs of applicator rollers 56, one applying an adhesive layer, the other applying a seal.

Each pair of applicator rollers 56 may, for example, apply an adhesive layer or seal to only one of the two opposing faces of the material strip 50, or apply an adhesive layer or seal simultaneously to both opposing faces of the material strip 50, or simultaneously apply an adhesive layer to one face of the material strip 50 and a seal to the other face of the material strip 50.

The material strips 50, possibly provided with seals and/or adhesive layers, are placed one on top of the other, preferably pressed against each other, for example by passing between two rollers of a pair of joining rollers 58 which press the material strips 50 against each other.

The superimposed strips of material 50 form a separator strip 60 consisting of a succession of bipolar separators 4 distributed along the separator strip 60.

Downstream of the pair(s) of collating rollers 58, the separator strip 60 optionally passes through a heating station 62. The heating station 62 is used, for example, to cure adhesive layers and/or seals between the material strips 50.

The separator strip 60 is cut into individual bipolar separators 4 by a cutting device 64.

Thanks to the invention, it is possible to easily manufacture bipolar separators 4 of satisfactory quality and in large quantities.

The superimposition of two distribution plates 14 and two cooling plates 16 makes it possible to manufacture these plates from thin sheets or strips of material with characteristics that are beneficial to the operation of the bipolar separator 4 and for its manufacture.

The channelling functions are advantageously distributed between the plates: Channelling the reactive fluids through the distribution plates and channelling the cooling fluid through the cooling plates.

The plates can be thin and can be made from sheets or strips that are easy to shape, for example by calendering or stamping between shaping rollers.

The use of thin plates allows a continuous manufacturing method to be implemented in which the distribution plates and cooling plates are produced as a material strip 50 and joined together to form a separator strip 60 which is cut into bipolar separators 4.

The invention claimed is:

1. A bipolar separator for an electrochemical reactor, the bipolar separator comprising:

two distribution plates each having an outer face and inner face, the outer face of each of the two distribution plates being provided with a distribution area in which distribution channels for flow of a reactive fluid extend along a longitudinal direction of the respective distribution plate, an entire area of the inner face of each of the respective distribution plates that is opposite the distribution area of the respective distribution plate being substantially flat; and two cooling plates disposed between the two distribution plates, the two cooling plates defining internal conduits for circulation of a cooling fluid between the two cooling plates, each of the two cooling plates having a first face facing an adjacent one of the two distribution plates and a second face facing another of the two cooling plates, at least one of the two cooling plates having, on the first face, at least one sealing groove configured to receive a seal interposed between the cooling plate and the adjacent distribution plate.

2. The bipolar separator according to claim 1, wherein the inner face of one or each of the distribution plates is substantially planar.

3. The bipolar separator according to claim 1, wherein the internal conduits are delimited between the two cooling plates.

4. The bipolar separator according to claim 1, wherein the inner face of the distribution plate facing the cooling plate is free of a sealing groove.

5. The bipolar separator according to claim 1, wherein at least one of the two cooling plates has, on the second face, cooling channels defining said internal conduits.

6. The bipolar separator according to claim 5, wherein an area of the first face of at least one of the cooling plates opposite the cooling channels is substantially flat.

7. The bipolar separator according to claim 5, wherein the cooling channels have a depth of between 0.20 mm and 0.35 mm.

8. The bipolar separator according to claim 5, wherein each of the cooling plates has, on the second face, cooling channels, each said cooling channel of one of the cooling plates being located opposite a said cooling channel of another of the two cooling plates and forming with the cooling channel of the other cooling plate an internal conduit.

9. The bipolar separator according to claim 1, further comprising distribution ports provided through the bipolar separator for the flow of the reactive fluid, each f the distribution ports being associated with the distribution channels of one of the distribution plates with which said distribution port is in fluid communication, the distribution channels of at least one of the distribution plates being in fluid communication with at least one of the distribution ports via connection ports formed through the distribution plate and opening into connection conduits defined between the distribution plate and the adjacent cooling plate and opening into the distribution ports.

10. The bipolar separator according to claim 1, wherein at least one of the distribution plates and the cooling plates is made of a graphite-based material, expanded graphite or carbon.

11. The bipolar separator according to claim 1, wherein at least one of the distribution plates and the cooling plates has a thickness of between 0.4 and 0.6 mm.

12. An electrochemical reactor, comprising a stack including alternating said bipolar separators according to claim 1 and membrane electrode assemblies.

13. A method of manufacturing a bipolar separator according to claim 1, comprising shaping four strips of material in parallel, each strip of material being shaped by passing between at least one pair of shaping rollers, two of the strips of material being shaped to form distribution plates and two of the strips of material being shaped to form cooling plates superimposing the four shaped strips of material to form a strip of separators formed by a succession of bipolar separators each formed of two cooling plates interposed between two distribution plates, then cutting the strip of separators to obtain bipolar separators.

14. The bipolar separator according to claim 5, wherein the cooling channels have a depth of 0.30 mm.

15. The bipolar separator according to claim 1, wherein at least one of the distribution plates and the cooling plates comprises a flexible graphite-based material.

16. The bipolar separator according to claim 1, wherein at least one of the distribution plates and the cooling plates has a thickness of 0.5 mm.

17. A bipolar separator for an electrochemical reactor comprising:

two distribution plates each having an outer face and an inner face, the outer face of each of the two distribution plates being provided with a distribution area in which distribution channels for flow of a reactive fluid extend along longitudinal direction of the respective distribution plate, an entire area of the inner face of each of the respective distribution plates that is opposite the distribution area of the respective distribution plate being substantially flat; and two cooling plates disposed between the two distribution plates, the two cooling plates defining internal conduits for circulation of a cooling fluid between the two cooling plates, each of the cooling plates having a first face facing an adjacent one of the two distribution plates and a second face facing another of the two cooling plates, at least one of the cooling plates having, on the second face, cooling channels defining said internal conduits, an area of the first face of at least one of the cooling plates opposite the cooling channels being substantially flat.

18. The bipolar separator according to claim 1, wherein each of the two cooling plates has a cooling area comprising the cooling channels of the respective cooling plate, and the cooling areas of the respective cooling plates and the distribution areas of the respective distribution plates are aligned in a stacking direction of the distribution plates and the cooling plates.

* * * * *